US008490528B2

(12) United States Patent
Aoyama

(10) Patent No.: US 8,490,528 B2
(45) Date of Patent: Jul. 23, 2013

(54) CUTTING DEVICE HAVING A POSITIONING MECHANISM

(75) Inventor: Syuji Aoyama, Anjo (JP)

(73) Assignee: Makita Corporation, Anjo (JP)

( * ) Notice: Subject to any disclaimer, the term of this patent is extended or adjusted under 35 U.S.C. 154(b) by 358 days.

(21) Appl. No.: 12/857,995

(22) Filed: Aug. 17, 2010

(65) Prior Publication Data

US 2011/0041666 A1 Feb. 24, 2011

(30) Foreign Application Priority Data

Aug. 20, 2009 (JP) ................................ 2009-190732

(51) Int. Cl.
*B23D 33/02* (2006.01)
*B27B 5/00* (2006.01)
*B26D 1/18* (2006.01)

(52) U.S. Cl.
USPC ............................... 83/473; 83/471.3; 83/490

(58) Field of Classification Search
USPC .................. 83/432, 473, 471.3, 477.2, 471.1, 83/397, 498–490, 581
See application file for complete search history.

(56) References Cited

U.S. PATENT DOCUMENTS 3,212,540 A * 10/1965 Smith ............................ 83/488
4,152,961 A * 5/1979 Batson ......................... 83/471.3
4,277,998 A * 7/1981 Mayo ........................... 83/404.1
5,249,496 A * 10/1993 Hirsch et al. ................. 83/471.3
5,421,228 A * 6/1995 Fukinuki ...................... 83/471.3
5,437,214 A * 8/1995 Sasaki et al. ................. 83/471.3
5,582,089 A * 12/1996 Sasaki et al. ................. 83/471.3
5,660,094 A * 8/1997 Sasaki et al. ................. 83/471.3
5,862,734 A * 1/1999 Brunson et al. ................. 83/581
5,943,239 A * 8/1999 Shamblin et al. ............. 700/160
6,032,562 A * 3/2000 Brunson et al. .............. 83/471.3
6,289,778 B1 * 9/2001 Wixey .......................... 83/471.3
6,513,412 B2 * 2/2003 Young .......................... 83/471.3
RE38,122 E * 5/2003 Kondo et al. ................ 83/471.3
6,865,976 B2 * 3/2005 Parks et al. .................. 83/471.3
7,210,385 B2 * 5/2007 Stumpf et al. ............... 83/471.3
7,331,264 B2 * 2/2008 Ozawa et al. ................ 83/471.3
7,337,702 B2 * 3/2008 Parks et al. .................. 83/471.3
7,549,360 B2 * 6/2009 Aoyama ...................... 83/471.3
7,574,950 B2 * 8/2009 Hetcher et al. .................. 83/473
8,359,959 B2 * 1/2013 Aoyama et al. .............. 83/471.3
2002/0100351 A1 * 8/2002 Bean et al. ................... 83/471.3
2003/0150311 A1 * 8/2003 Carroll et al. ................ 83/471.3
2003/0200852 A1 * 10/2003 Romo ............................ 83/473
2004/0089125 A1 * 5/2004 Schoene et al. .............. 83/471.3
2006/0266184 A1 * 11/2006 Hetcher et al. ............... 83/471.3
2007/0221028 A1 * 9/2007 Chen ........................... 83/467.1

FOREIGN PATENT DOCUMENTS

JP A-2003-205501 7/2003
JP A-2003-245901 9/2003

* cited by examiner

*Primary Examiner* — Ghassem Alie
*Assistant Examiner* — Bharat C Patel
(74) *Attorney, Agent, or Firm* — Oliff & Berridge, PLC

(57) ABSTRACT

A cutting device includes a positioning mechanism for positioning a cutting unit at a plurality of tilt angles including a first tilt angle and a second tilt angle in a left direction and/or a right direction. The first tilt angle is larger than the second tilt angle. A setting state for the first tilt angle is reset to a setting state for the second tilt angle when a positioning state at the first tilt angle is released.

20 Claims, 10 Drawing Sheets

CUTTING DEVICE HAVING A POSITIONING MECHANISM

This application claims priority to Japanese patent application serial number 2009-190732, the contents of which are incorporated herein by reference.

BACKGROUND OF THE INVENTION

1. Field of the Invention

The present invention relates to cutting devices having a positioning mechanism for positioning a cutting unit at a plurality of left or right tilt positions.

2. Description of the Related Art

Cutting devices are known that has a cutting unit vertically tiltable relative to a table for cutting a workpiece placed on a table. The cutting unit has a rotary cutting tool, such as a circular grinding wheel or a circular saw blade. The cutting unit is tiltable also laterally (left and right). A positioning mechanism is provided for positioning the cutting unit at a predetermined left or right tilt position.

Among the cutting devices, those used mainly for cutting wooden materials have a table rotatable within a horizontal plane. A cutting unit is supported on the table, so that the cutting unit rotates to change its direction within a horizontal plane as the table rotates. On the upper side of the table, a positioning fence is provided for positioning a workpiece within the horizontal plane. Therefore, rotating the table relative to the positioning fence can change a cut angle of a rotary cutting tool of the cutting unit relative to a reference surface of the workpiece. Therefore, by vertically pivoting the cutting unit, the rotary cutting tool can cut the workpiece in a direction inclined relative to the reference surface within a horizontal plane. This cutting operation is called an "oblique cutting operation" and during the oblique cutting operation, the rotational axis of the rotary cutting tool is held to extend horizontally. On the other hand, with the cutting unit tilted laterally in left or right direction, where the rotational axis of the rotary cutting tool is inclined relative to the horizontal plane, it is possible to cut a workpiece in a direction inclined relative to a vertical direction. This cutting operation is called an "inclined cutting operation."

In order to enable the inclined cutting operation, it is necessary to position the cutting unit at a left or right tilt position in addition to a vertical position (where the cutting unit is not tilted laterally). To this end, various positioning mechanisms have been proposed, for example, in U.S. Pat. No. 7,337,702 and Japanese Laid-Open Patent Publication Nos. 2003-205501 and 2003-245901.

The positioning mechanisms of the above published documents are basically the same and each mainly includes a base portion (stationary side) fixed to the table and a support portion (tilting side) coupled to the base portion via a horizontal support shaft so as to be capable of rotating within a predetermined range about an axis of the support shaft. The cutting unit is supported on the support portion. Stopper bolts are mounted to one of the base portion and the support portion. Stopper projections are provided at the other of the base portion and the Support portion for abutment to the stopper bolts, so that the cutting unit can be positioned at any of the vertical position and the tilt position without need of observation of an angle scale. This type of positioning mechanism is called a "positive stop mechanism."

However, the positioning mechanisms of the above publications still need improvements. For example, in the case of the positioning mechanism of U.S. Pat. No. 7,337,702, the cutting unit can be selectively positioned at a plurality of tilt positions in left or right direction by the operation of an operation rod. However, if a user forgets to return the operation rod to its original position after the inclined cutting operation has been performed with a large tilt angle, a workpiece may still be cut with the large tilt angle regardless of the user's intention to cut the workpiece with a smaller tilt angle after that. If this occurs, disposal of the workpiece as waste would be necessary. On the other hand, if a user forgets to return the operation rod to its original position after the inclined cutting operation has been performed with a small tilt angle, a workpiece may be cut with the small tilt angle regardless of the user's intention to cut the workpiece with a larger tilt angle after that. However, in this case, an additional cutting operation may be preformed to cut the workpiece at the large tilt angle.

Thus, in the case that the positioning mechanism allows the cutting unit to be selectively positioned at a plurality of tilt positions in left or right direction, forgetting the operation of the operational rod after the inclined cutting operation with a large tilt angle may lead to disposal of the workpiece as waste.

Therefore, there is a need in the art for a positioning device that is improved in operability for positioning a cutting unit of a table cutting device at a plurality of positions tilted in a left or right direction.

SUMMARY OF THE INVENTION

A cutting device includes a positioning mechanism for positioning a cutting unit at a plurality of tilt positions including a first tilt angle and a second tilt angle in a left direction and/or a right direction. The first tilt angle is larger than the second tilt angle. A setting state for the first tilt angle is reset to a setting state for the second tilt angle when a positioning state at the first tilt angle is released.

BRIEF DESCRIPTION OF Tim DRAWINGS

DETAILED DESCRIPTION OF THE INVENTION

Figure 1:
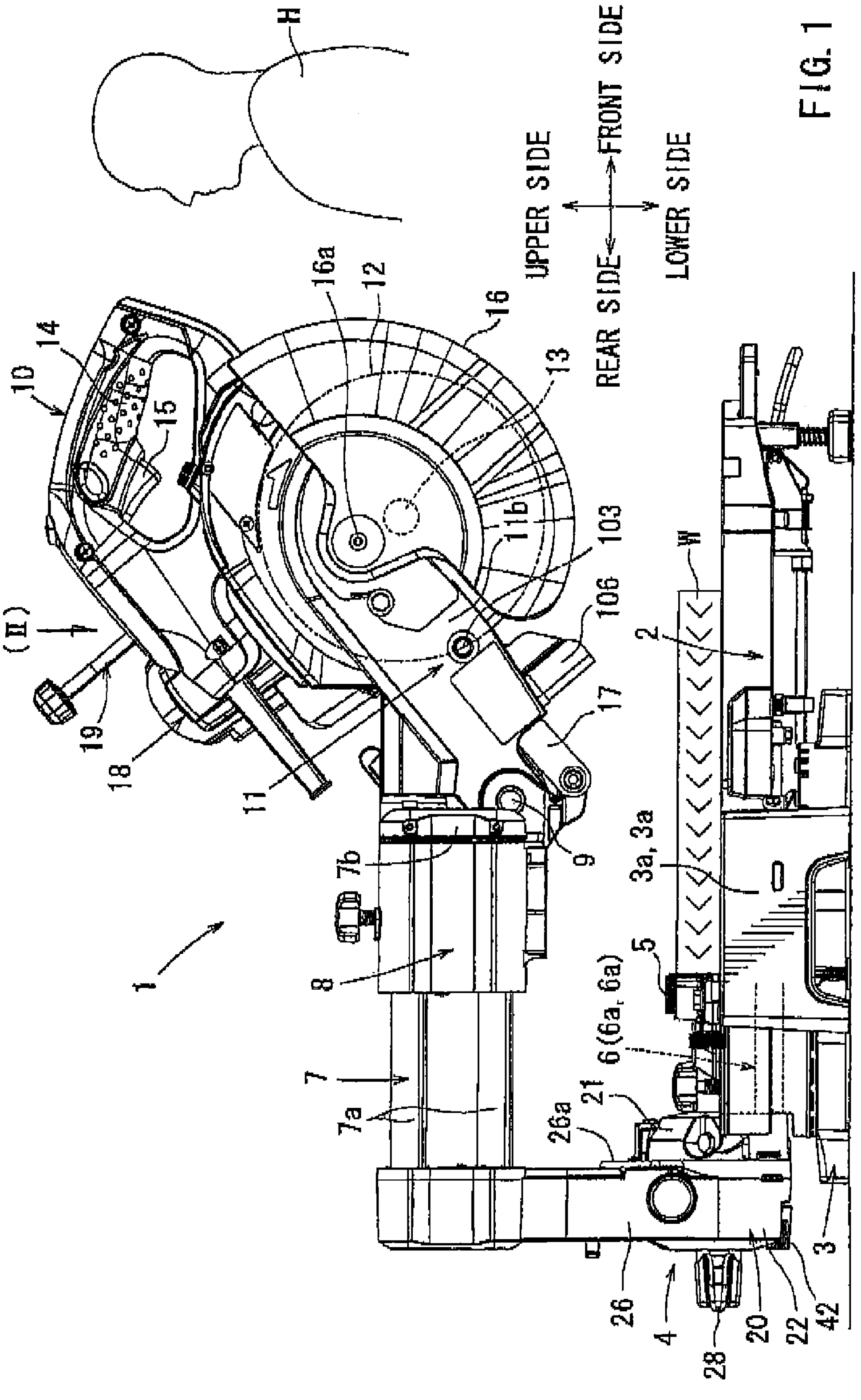
FIG. 1 is a side view of a cutting device incorporating a positioning mechanism according to an example.
Figure 2:
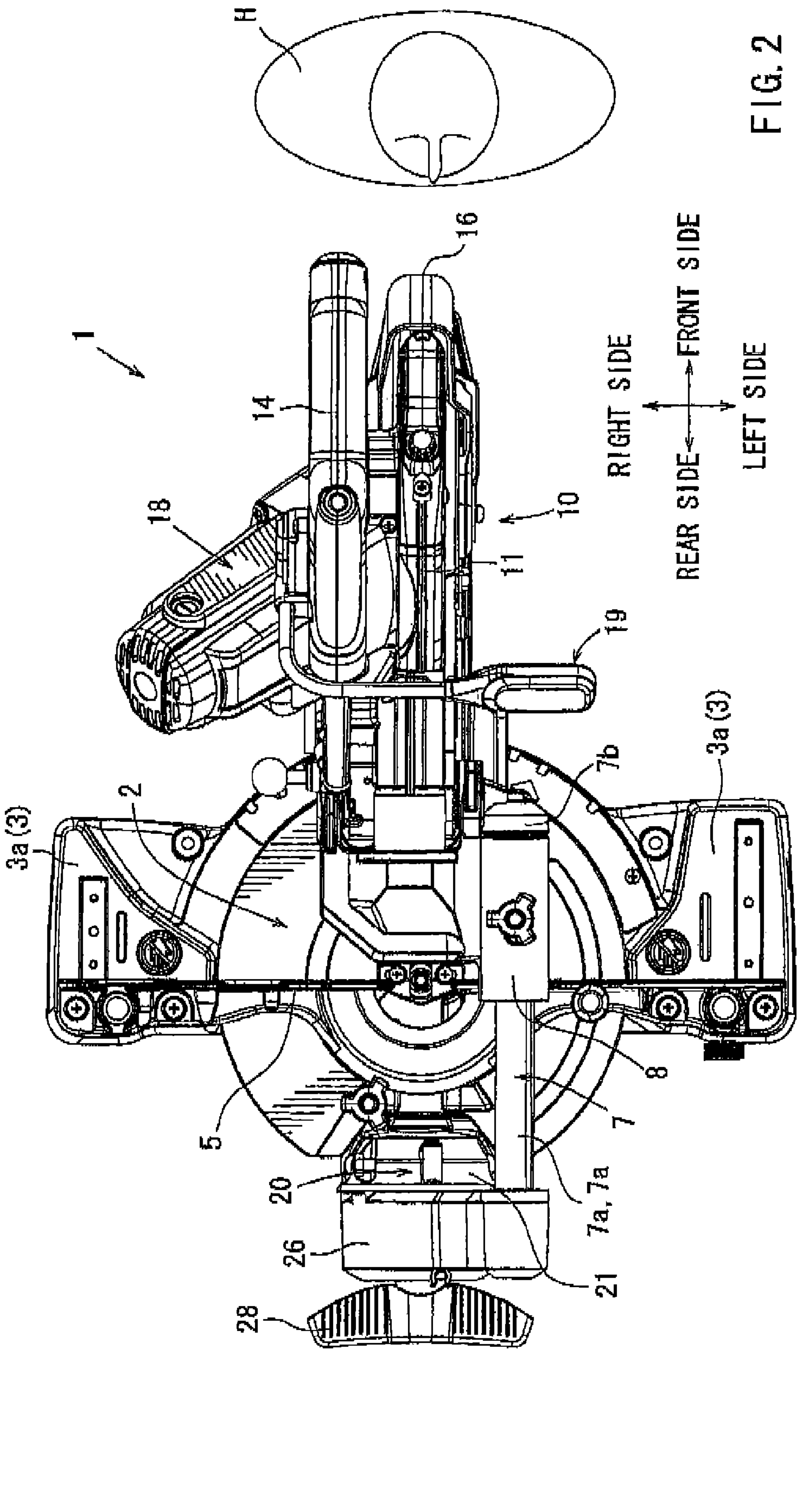
FIG. 2 is a plan view of the cutting device.

Each of the additional features and teachings disclosed above and below may be utilized separately or in conjunction with other features and teachings to provide improved positioning mechanisms and cutting devices incorporating such positioning mechanisms. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention, Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one example, a cutting device includes a table capable of placing a workpiece thereon, a cutting unit supported on the table and positioned above the table, and a positioning mechanism capable of positioning the cutting unit at a plurality of tilt angles including a first tilt angle and a second tilt angle in at least one of a left direction and a right direction. The first tilt angle is larger than the second tilt angle. The positioning mechanism is configured such that a setting state for the first tilt angle is reset to a setting state for the second tilt angle when a positioning state at the first tilt angle is released.

With this arrangement, when a positioning state at the first tilt angle is released, the setting state for the first tilt angle automatically changes to a setting state for the second tilt angle that is smaller than the first tilt angle. Therefore, it is no longer necessary for the user to switch the setting state. Thus, if the user intends to cut a workpiece with a small cut angle after cutting another workpiece with a large cut angle, unintended cutting with a large out angle can be reliably prevented without need of the switching operation by the user.

In the ease that a workpiece that should be out with a large cut angle was cut with a small cut angle by mistake, cutting again the workpiece with the large cut angle can remove a portion that corresponds to a shortfall. Therefore, the workpiece can be used without need of disposal. On the other hand, if a work-piece that should be cut with a small cut angle was cut with a large cut angle by mistake, it is not possible to repair the workpiece to have the small cut angle. Therefore, disposal of the workpiece as waste would be necessary in some eases. As a result, loss of material (workpiece) is caused.

Therefore, the positioning mechanism of the cutting device of the above example enables effective use of workpieces, and hence the usability of the positioning mechanism as well as the cutting device can be improved.

The cutting device may further include a base portion on the side of the table and a support portion on the side of the cutting unit. The support portion can rotate relative to the base portion, so that the cutting unit can tilt in the left direction and/or the right direction. The positioning mechanism may include a stopper bolt mounted to one of the base portion and the support portion, and a switching rod mounted to the other and capable of contacting the stopper bolt. The switching rod includes a first positioning surface and a second positioning surface for positioning of the cutting unit at the first tilt angle and the second tilt angle, respectively. A biasing device may bias the switching rod toward an initial position where the second positioning surface can contact the stopper bolt.

With this arrangement, resetting the setting state to the second tilt angle can be achieved by a simple construction in the case that the positioning of the cutting unit is made through contact between the switching rod and the stopper bolt. The switching rod may be rotated or slid in the axial direction for switching the tilt angle of the cutting unit. In the case that the rotatable switching rod is used, the first end second positioning surfaces may be arranged in the circumferential direction of the switching rod. On the other hand, in the case that the axially slidable switching rod is used, the first and second positioning surfaces may be arranged in the axial direction. In the former case, the switching rod may be biased in the rotational direction to achieve the resetting function. In the latter case, the switching rod may be biased in the axial direction to achieve the resetting function.

Figure 3:
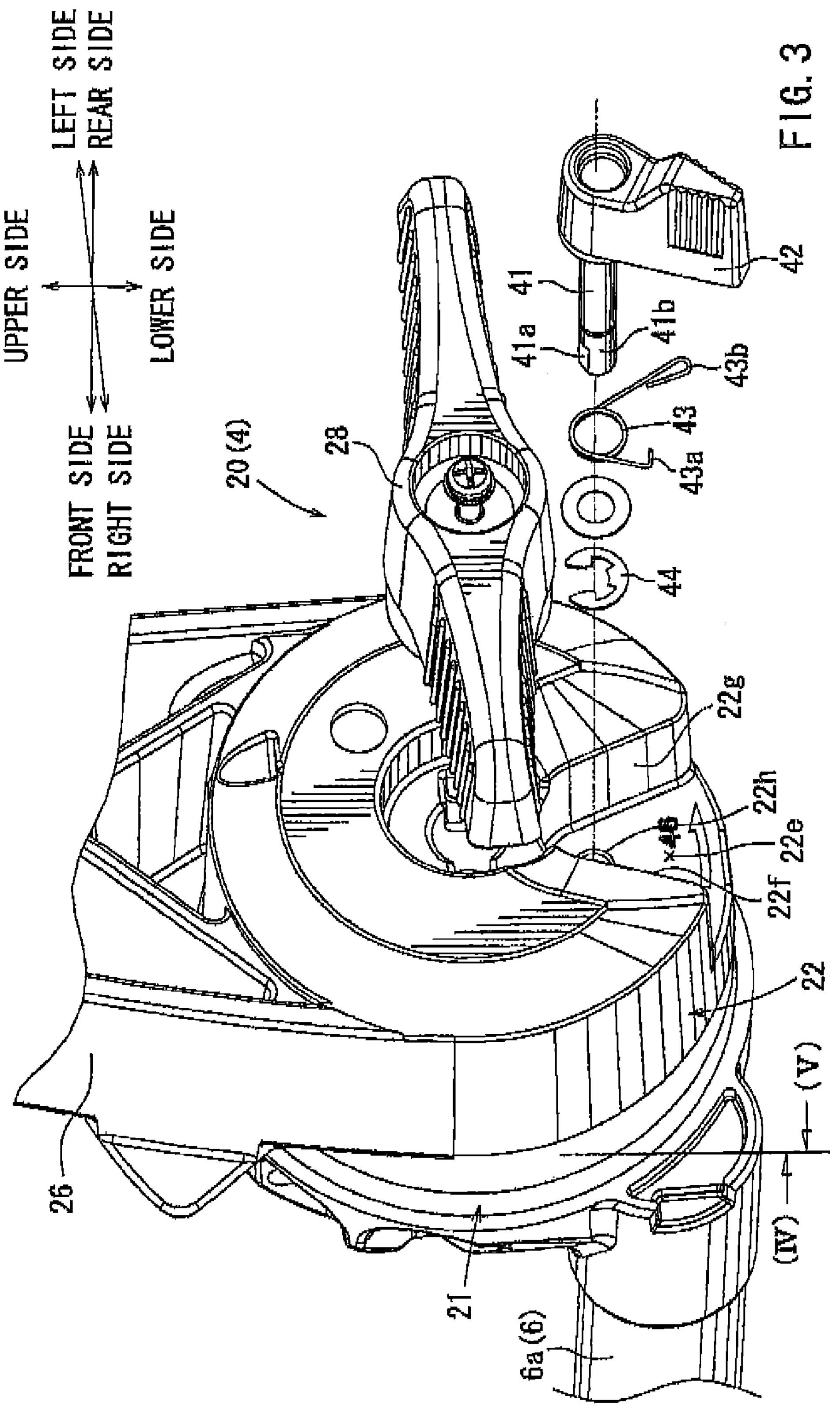
FIG. 3 is a perspective view as viewed from a rear side of a support for supporting a tool unit of the cutting device.
Figure 4:
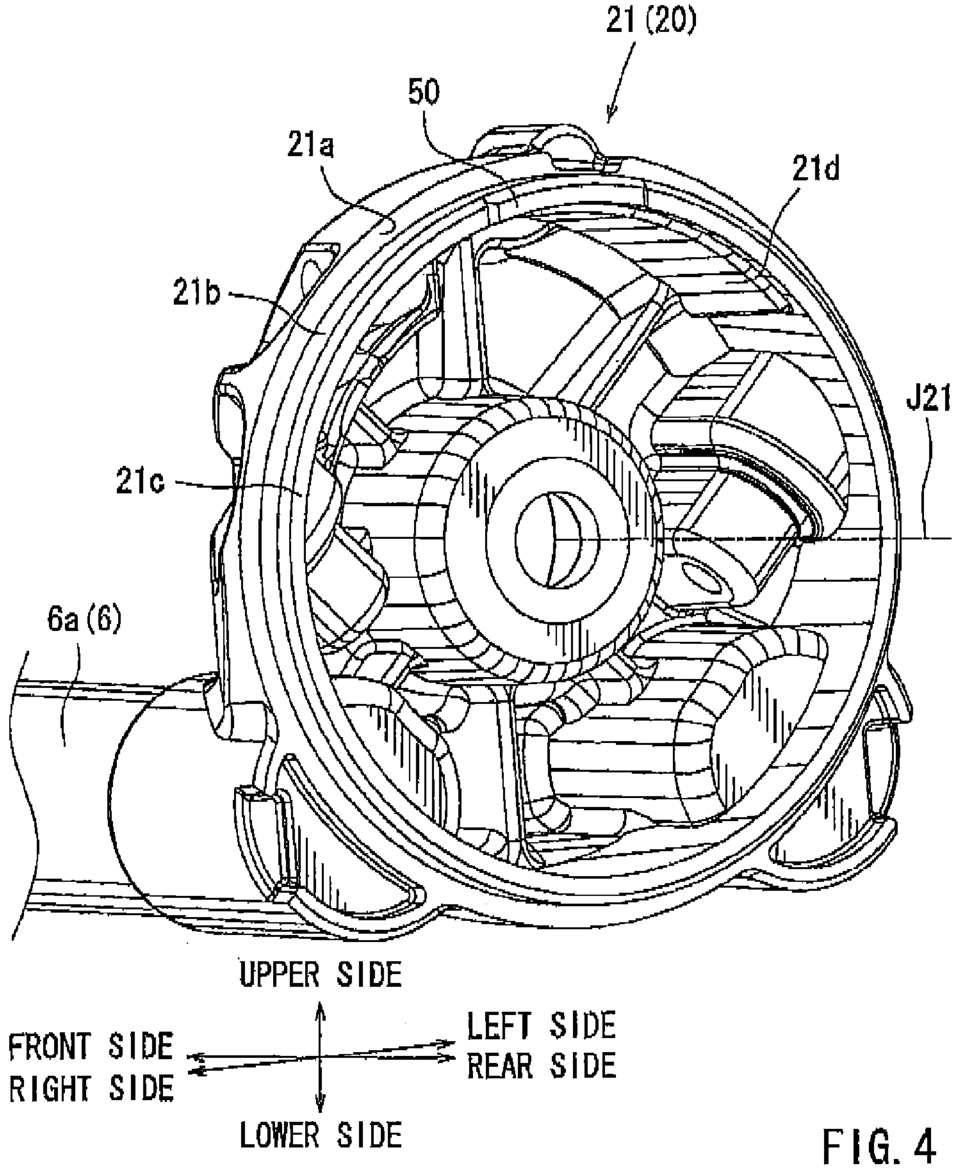
FIG. 4 is a perspective view as viewed from a rear side of a base portion of the cutting device, while the illustration of first, second and third bolts being omitted.

The first positioning surface may include a pair of flat surfaces disposed on opposite sides of the switching rod with respect to a diametrical direction. With this arrangement, the first and second positioning surfaces can be formed by a simple cutting operation of the switching rod and it is not necessary to mount a separate member for providing the first and second positioning surfaces A representative example will now be described with reference to FIGS. 1 to 13. Referring to FIG. 1, a representative cutting device 1 generally includes a table 2, on which a workpiece W can be placed, a base 3 horizontally rotatably supporting the table 2 within a limited angular range of rotation, and a cutting unit support 4 disposed on the rear portion (left end portion as viewed in FIG. 1) of the table 2, and a cutting unit 10 supported at a position above the table 2 via the cutting unit support 4. In order to operate the table cutting device 1, a user H may be positioned on the right side of the table cutting device 1 as shown in FIG. 1. In the following description, terms "forward" or "front"; "rearward" or "rear", "leftward" or "left", "rightward" or "right", "upward" or "up" and "downward" or "down" used for explaining the components or the structures of the table cutting device 1 are those as viewed from the side of the user H unless otherwise indicated. These directions are also indicated in FIGS. 1 to 13. As for FIGS. 3 and 4, the directions indicated in these figures are different from those when viewed with reference to the sheet surfaces. This is because FIGS. 3 and 4 are views as viewed from the rear side.

A positioning fence 5 extends over an upper surface of the table 2 and can position the workplace W within the horizontal plane. The positioning fence 5 extends between a pair of auxiliary tables 3*a* that are positioned on the right and left sides of the table 2. A small clearance is provided between the positioning fence 5 and the upper surface of the table 2 so as to enable rotation of the table 2 relative to the positioning fence 5. A clamp device (not shown) may clamp the workpiece W against the upper surface, of the table 2, so that the workplace W can be fixed in position relative to the table 2.

The cutting unit support 4 includes a lower slide mechanism 6, an upper slide mechanism 7 and a positioning mechanism 20. The lower and upper slide mechanism 6 and 7 serve to support the cutting unit 10 such that the cutting unit 10 can slide relative to the table 2 in forward and rearward directions (left and right directions as viewed in FIGS. 1 and 2). The positioning mechanism 20 serves to position the cutting unit 10 at positions tilted in right and left directions (a direction perpendicular to the sheet of FIG. 1) and also at a vertical position. In this embodiment, the positioning mechanism 20 includes a that positioning mechanism 30 for positioning the cutting unit 10 at the vertical position and a second positioning mechanism 40 for positioning the cutting unit 10 at right and left tilt positions as will be explained later. The positioning mechanism 20 is supported on the lower slide mechanism 6 so as to be positioned on the rear side of the table 2 and is movable in forward and rearward directions with the sliding movement of the lower slide mechanism 6. The lower slide mechanism 6 includes a pair of slide bars 6*a* extending parallel to each other in the horizontal direction and spaced from each other by a predetermined distance.

The cutting unit 10 is supported on the upper slide mechanism 7 at a position on an upper side of a support arm 26 of the positioning mechanism 20. The upper slide mechanism 7 includes a pair of slide bars 7*a* extending parallel to each other and spaced from each other by a predetermined distance in the vertical direction. The front ends of the slide bars 7*a* are joined to each other by a holder 7*b*. The cutting unit 10 is vertically tiltably supported on a support slider 8 via a support shaft 9. The support slider S constitutes a part of the upper slide mechanism 7 and can slide along the slide bars 7*a*. The lower and upper slide mechanisms 6 and 7 enable the cutting unit 10 to slide in a cutting direction for cutting by the cutting unit 10. Normally, the cutting unit 10 is slid from the front side toward the rear side (from the right side toward the left side as viewed in FIGS. 1 and 2) for cutting the workpiece W.

The cutting unit 10 has a unit case 11, the rear portion of which is pivotally supported on the support slider 8 of the upper slide mechanism 7 via the support shaft 9. The unit case 11 covers substantially an upper half of a circular rotary cutting tool 12 that rotates in a clockwise direction as viewed in FIG. 1, which direction is marked by an outline arrow on a surface of the unit case 11. The rotary cutting tool 12 may be a rotary cutting blade, a rotary saw blade or a rotary grinding wheel an is mounted to a spindle 13 that is rotatably supported within the unit case 11. An electric motor 18 and a reduction gear mechanism (not shown) are mounted to a backside (right side as viewed from the user 11) of the unit case 11. The rotation of the motor 18 can be transmitted to the spindle 13 via the reduction gear mechanism. In this example, the rotational axis of the spindle 13 is in line with the rotational axis of the rotary cutting tool 12.

A handle 14 capable of being grasped by a hand of the user H is mounted to the backside of the unit case 11. The user H can operate a switch lever 15 with fingers of his or her hand while grasping the handle 14 with the same hand, so that the electric motor 18 starts to rotate the rotary cutting tool 12. In addition, the user H can tilt the tool unit 10 vertically downward by grasping the handle 14, so that the rotating cutting tool 12 moves to cut into the workpiece W.

A movable cover 16 can cover substantially the lower half of the rotary cutting tool 12. The movable cover 16 is vertically rotatably supported by the unit case 11 via a support shaft 16*a* that extends parallel to the spindle 13'. A link lever 17 interconnects between the movable cover 16 and the front end portion of the support slider 8 such that the movable cover 16 can move to cover and uncover the exposed lower half of the rotary cutting tool 12 in response to the vertical movement of the cutting unit 10.

An illuminating device 19 is mounted to a lateral side of the handle 14 and can emit light for facilitating the cutting operation in a dark place.

The positioning mechanism 20 will now be described with reference to FIGS. 3 to 13. The positioning mechanism 20 generally includes a base portion 21 and a support portion 22 each having a substantially circular cup shape, The base portion 21 is supported on the lower slide mechanism 6 so as to be positioned on the rear side of the table 2 and is movable in forward and rearward directions. More specifically, the rear ends of the slide bars 6*a* of the slide mechanism 6 are secured to the base portion 21.

The support portion 22 is coupled to the base portion 21 via a support shaft 23 so as to be rotatable relative to the base portion 21 about an axis of the support shaft 23. The support arm 26 for supporting the tool unit 10 is formed integrally with the upper portion of the support portion 22 and extends upwardly therefrom. Therefore, rotating the support portion 22 about the support shaft 23 causes the tool unit 10 to tilt laterally (leftward or rightward). An angular scale plate 26*a* is attached to the front surface of the support arm 26 at a position on the upper side of the support portion 22 for indicating a laterally tilt angle of the tool unit 10.

The support shaft 23 has a front portion configured as a threaded shaft portion 23*a* extending forwardly from the base portion 21, A fixing nut 27 is engaged with the threaded shaft portion 23*a*. A through-hole 23*c* is formed in the middle portion of the support shaft 23 and extends in a diametrical direction perpendicular to the axial direction of the support shaft 23. A pin 24 is inserted into the through-hole 23*c* and serves to prevent rotation of the support shall 23 relative to the base portion 21. Tightening the fixing nut 27 with a weak force can temporarily fix the support portion 22 relative to the base portion 21 such that the support portion 22 cannot move away from the base portion 21 but can rotate relative to the base Portion 21. Also, a rear portion of the support shaft 23 is configured as a threaded shaft portion 23*b*. A fixing nut 25 is engaged with the threaded shaft portion 23*b*. A fixing lever 28 is mounted to the fixing nut 25. Pivoting the fixing lever 28 in a tightening direction causes the fixing nut 25 to be tightened, so that the support portion 22 is fixed in position relative to the base portion 21 at a desired laterally tilt position. On the other hand, pivoting the fixing lever 28 in a loosening direction causes the fixing nut 25 to be loosened, so that the support portion 22 is allowed to rotate relative to the base portion 21, and hence, it is possible to tilt the cutting unit 10 laterally in left or right.

Referring to FIGS. 4 to 7, at the radially outermost position of the rear portion of the base portion 21, a radially outer flat surface 21*a* defining a bottom of an axial recess is formed. On the radially inner side of the outer flat portion 21*a*, a radially inner side surface 21*b* defining a side surface of an annular projection about the axis of the support shaft 23 is formed. On the rear side of the inner side surface 21*b*, a radially inner flat surface 21*c* defining an end surface of the annular projection is formed. On the other hand, at the radially outermost position of the front portion of the support portion 22, a radially outer flat surface 22*a* defining an end surface of an axial projection is formed. On the radially inner side of the outer flat surface 22*a*, a radially inner side surface 22*b* defining a side surface of an annular recess about the axis of the support shaft 23 is formed. At the bottom of the annular recess, a radially inner flat surface 22*c* is formed. The support portion 22 is rotatably coupled to the base portion 21 with the inner side surface 21*b* and the inner side surface 22*b* fitted with each other with an intervention, of a small clearance. Grease storage recesses 22*d* for the purpose of lubrication between the inner side surfaces 21*b* and 22*b* are formed in the inner side surface 22*b* at six positions spaced equally from each other in the circumferential direction.

Due to fitting between the inner side surfaces 21*b* and 22*b*, it is possible to accurately set a rotational axis of the support portion 22 for rotation relative to the base portion 21 and to eventually accurately set an axis J, about which the cutting unit 10 laterally tilts. It should be noted that the axis J is not necessary to coincide with the axis of the support shaft 23 but is determined by the central axes of the inner side surfaces 21*b* and 22*b*. In this example, the axis J is set to be positioned within a plane of the upper surface of the table 2 and to extend through the rotational axis of the table 2 in a plan view.

As will be explained later, in order to accurately position the axis J relative to the plane of the upper surface of the table 2 and the rotational axis of the table 2, particular features are given to the inner side surfaces 21*b* and 22*b*.

Because the inner side surfaces 21*b* and 22*b* opposed to each other in the radial direction are fitted with each other on the radially outer side of the support shaft 23, it is possible to ensure rigidity that is enough for bearing against the load applied by the tool unit 10 that may have a relatively heavy weight. In addition, due to slide contact between the inner side surfaces 21*b* and 22*b*, the tool unit 10 can be smoothly tilted.

The rotational position of the support portion 23 relative to the base portion 22 and eventually the laterally tilt position of the cutting unit 10 can be set to any one of a plurality of tilt angles. In this example, for each of the left and right tilt positions, it is possible to set the laterally tilt position at a 45° tilt position and a 46° tilt position, where the cutting unit 10 is tilted laterally by angles of 45° and 46°, respectively, from the vertical position.

The vertical position of the cutting unit 10 is used for cutting a workpiece W in a vertical direction perpendicular to the upper surface of the table 2. In the vertical position, the rotational axis of the rotary cutting tool 12 or the rotational axis of the spindle 13 extends parallel to the upper surface of the table 2. The vertical position is most frequently used for cutting workplaces and can be set by the first positioning mechanism 30.

Figure 5:
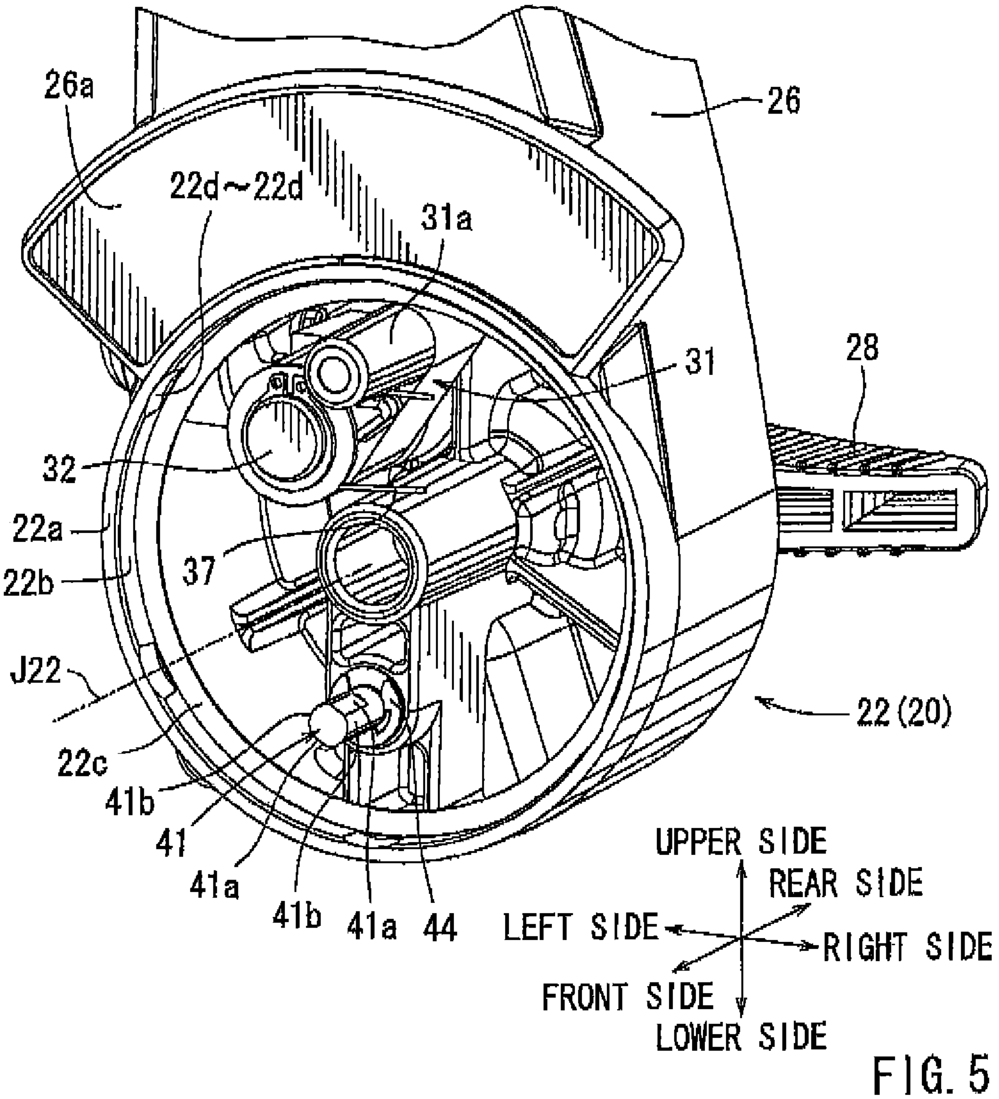
FIG. 5 is a perspective view as viewed from a front side of a support portion of the cutting device, while the illustration of pivotal support shaft being omitted.
Figure 6:
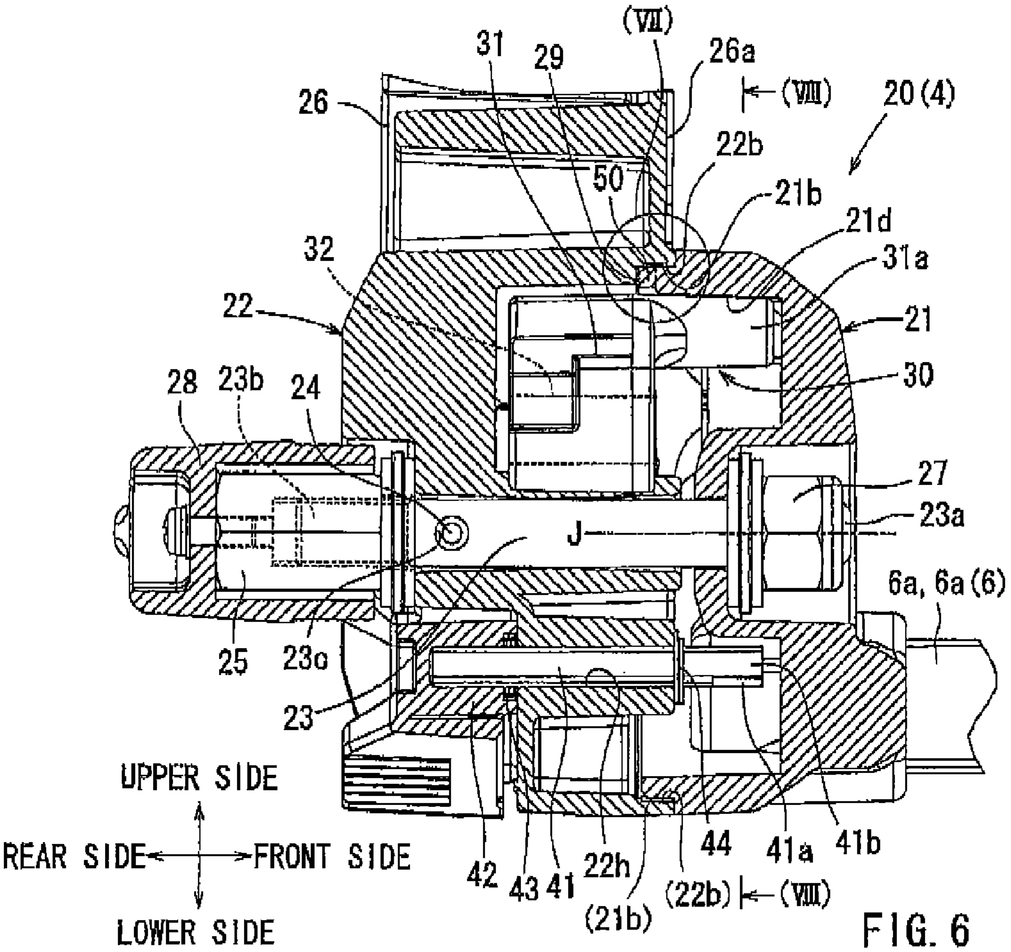
FIG. 6 is a vertical sectional view of the support.
Figure 7:
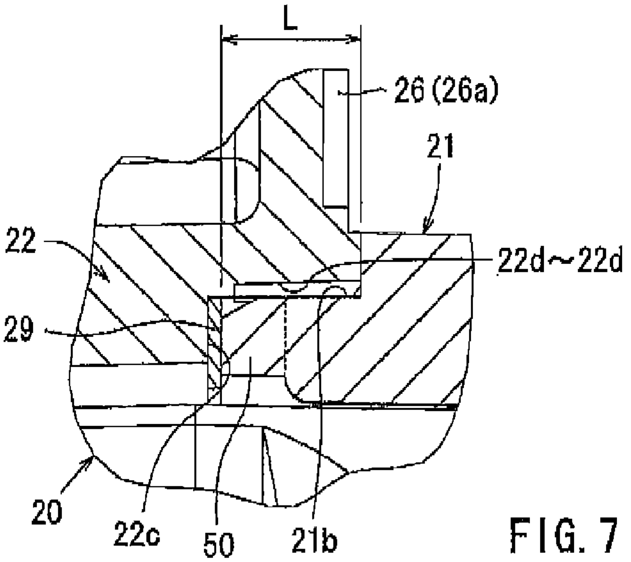
FIG. 7 is an enlarged view of a region (VII) indicated in FIG. 6 and showing a vertical sectional view of a fitting portion between a radially inner side surface of the base portion and a radially inner side surface of the support portion.
Figure 8:
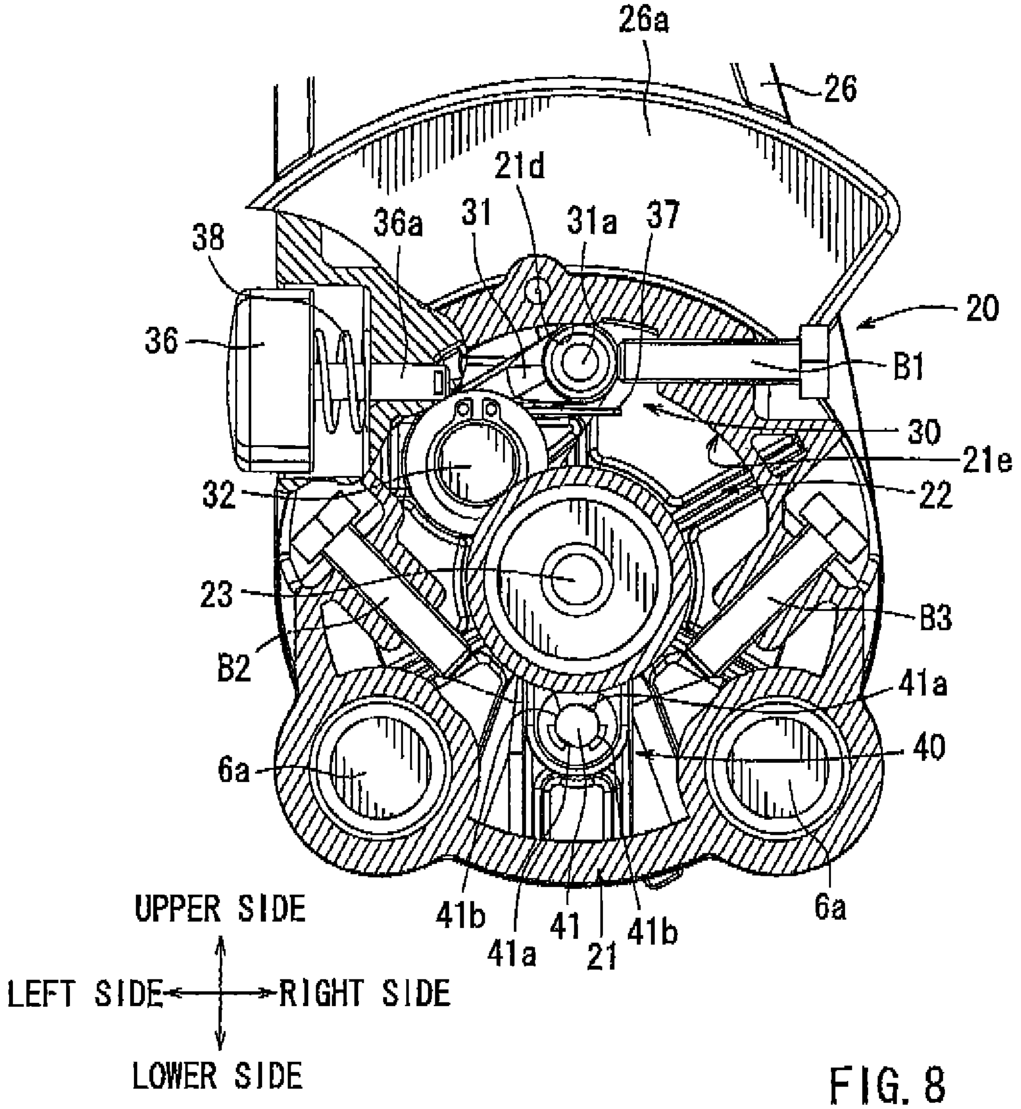
FIG. 8 is a sectional view taken along line VIII-VIII in FIG. 6 and showing the positioning mechanism as viewed from the front side when the cutting unit is positioned at a vertical position.

As shown in FIGS. 5, 6 and 8, the first positioning mechanism 30 includes a positioning member 31, The positioning member 31 is rotatably supported by the support portion 22 via a support shaft 32 and positioned within the support portion 22. The support shaft 32 extends parallel to the support shaft 23. A substantially cylindrical contact portion 31*a* is mounted to one end the positioning member 31 positioned away from the support shaft 32 and extends into the base portion 21.

The positioning member 31 is biased by a torsion spring 37 in a counterclockwise direction as viewed in FIG. 8, so that the positioning member 31 can be held in contact with a positioning wall portion 21*d* formed on the inner circumferential wall of the base portion 21.

As shown in FIG. 8, a headed first stopper bolt B1 is disposed at the right upper portion of the base portion 21. More specifically, the first stopper bolt B1 is screwed into a corresponding threaded hole formed in the right upper portion of the base portion 21 from the outer side of the base portion 21, so that an end portion of the first stopper bolt B1 extends into inside of the base portion 21. The first stopper bolt B1 is used for setting the vertical position of the cutting unit 10 and extends substantially parallel to the upper surface of the table 2. Thus, the vertical position can be set when the contact portion 31*a* of the positioning member 31 contacts both of the positioning wall portion 21*d* and the end portion of the first stopper bolt B1. After the vertical position has been set in this way, the fixing lever 28 is tightened to fix the support portion 22 in position relative to the base portion 21, so that the cutting unit 10 can be fixed at the vertical position.

In the state where the contact portion 31*a* of the positioning member 31 is in contact with the positioning wall portion 21*b* of the base portion 21 by the biasing force of the torsion spring 37, the cutting unit 10 can be tilted leftward from the vertical position but cannot be tilted rightward. In order to tilt the tool unit 10 rightward from the vertical position, it is necessary to rotate the positioning member 31 in a clockwise direction as shown in FIGS. 9 and 11 so as to move the contact portion 31*a* away from the positioning wall portion 21*d* until reaching a release position.

The user H can move the positioning member 31 to the release position by pushing a button 36 that is used when the tool unit 10 is necessary to be tilted rightward. The button 36 is mounted to a lateral side portion of the support portion 22 and has an operational rod 36*a* extending into inside of the support portion 22. The end portion of the operational rod 36*a* is oriented toward the lateral side of the positioning member 31. The button 36 is biased by a compression spring 38, so that the end portion of the operational rod 36*a* is normally held in contact with the lateral side of the positioning member 31. When the user pushes the button 36 rightward as viewed in FIG. 8 against the biasing force of the compression spring 38, the operational rod 36*a* pushes the positioning member 31 against the biasing force of the torsion spring 37, so that the positioning member 31 moves to the release position. When the positioning member 31 is in the release position, the contact portion 31*a* is prevented from interacting with the first stopper bolt B1, so that the cutting unit 10 can be tilted rightward.

Figure 9:
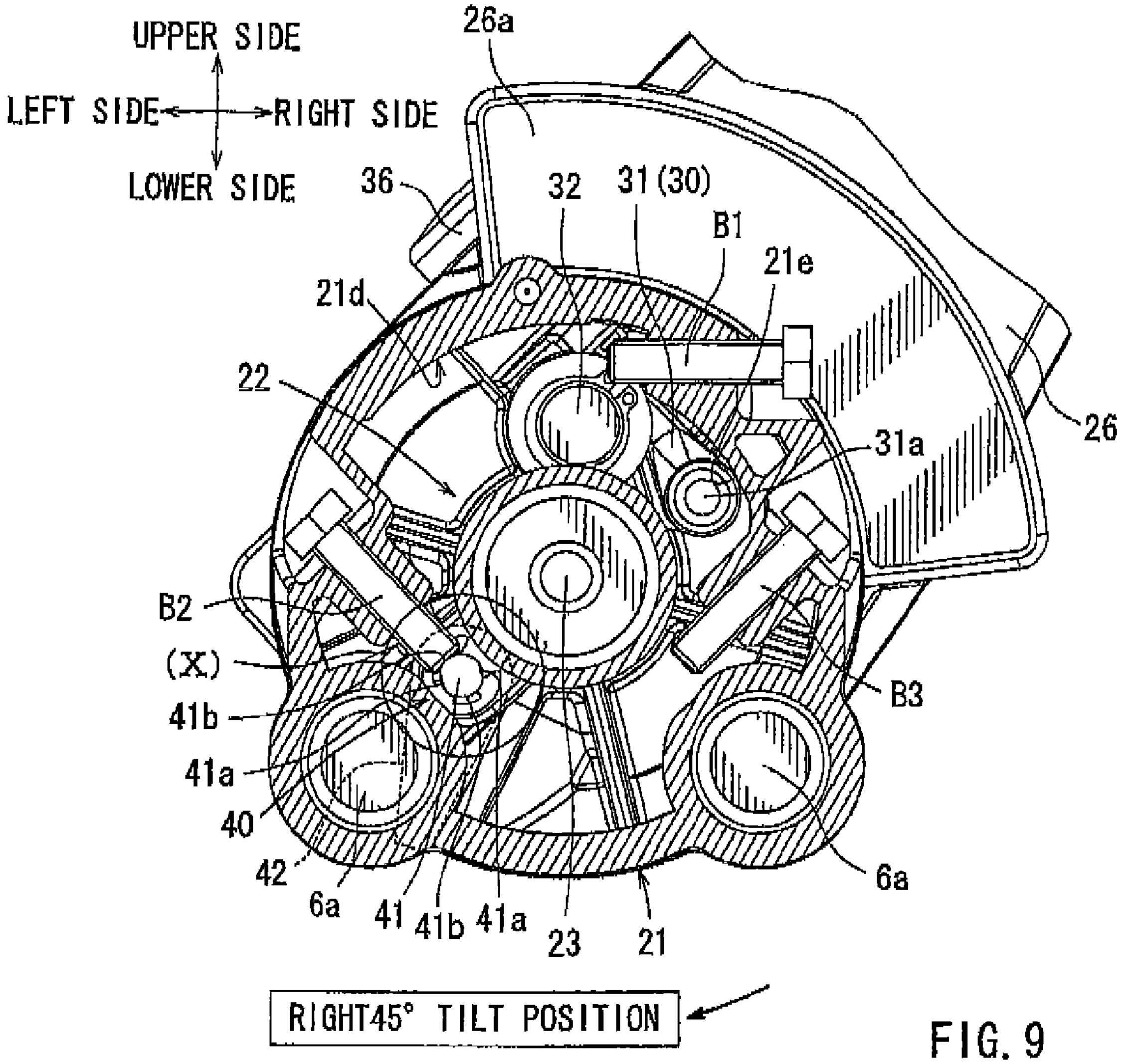
FIG. 9 is a sectional view similar to FIG. 8 but showing the operation of the positioning mechanism when the cutting unit is positioned at a right 45° tilt position.
Figure 11:
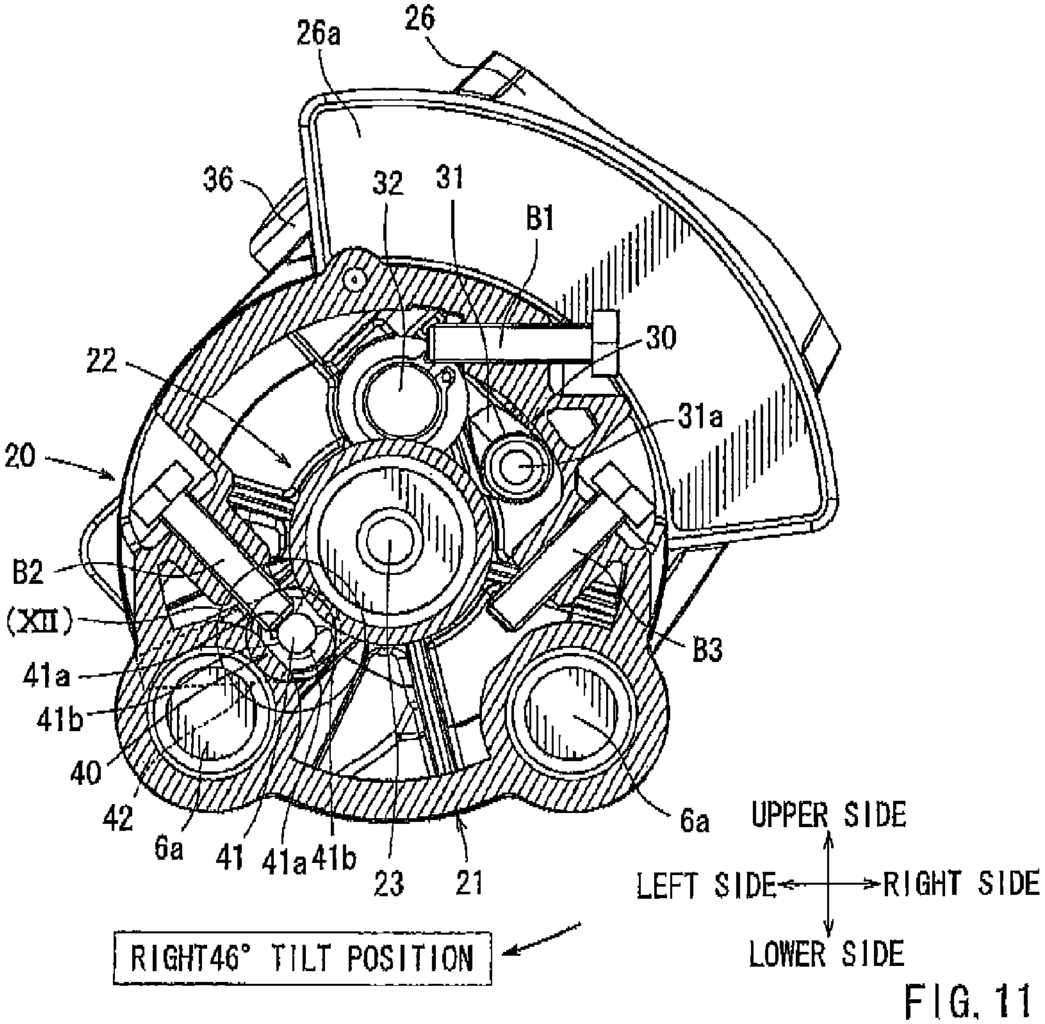
FIG. 11 is a sectional view similar to FIG. 8 but showing the operation of the positioning mechanism when the cutting unit is positioned at a right 46° tilt position.

As shown in FIGS. 9 and 11, as the cutting unit 10 is tilted rightward, the contact portion 31*a* passes the radially inner side of the first stopper bolt B1 and is thereafter contacts a release wall 21*c* and held in this position. When releasing the pushing force applied to the button 36, the button 36 returns to its initial position shown in FIG. 8 by the biasing force of the compression spring 38.

If the cutting unit 10 is tilted leftward from the right tilt position, at the same time the vertical position is passed, the positioning member 31 automatically returns from the release position to a positioning position by the biasing force of the torsion spring 37. Therefore, when the cutting unit 10 is tilted again rightward after passing the vertical position, the contact portion 31*a* of the positioning member 31 contacts both of the positioning wall 21*d* and the first stopper bolt B1, so that the cutting unit 10 can be set accurately at the vertical position.

The protruding distance of the stopper bolt B1 into the base portion 21 can be adjusted by rotating the stopper bolt B1 from the outer side of the base portion 21. Therefore, it is possible to finely adjust the vertical position by adjusting the screwing amount of the stopper bolt B1.

The second positioning mechanism 40 allows the cutting unit 10 to be set at a 45° tilt position and a 46° tilt position for each of right and left tilling directions. The second positioning mechanism 40 includes a headed second stopper bolt B2, a headed third stopper bolt B3 and a switching rod 41. The second stopper bolt B2 shown on the left side in FIG. 8 is used for positioning the cutting unit 10 at the 45° tilt position and the 46° tilt position in the right tilting direction. The third stopper bolt B3 shown on the right side in FIG. 8 is used for positioning the cutting unit 10 at the 45° tilt position and the 46° tilt position in the left tilting direction. The second and third stopper bolts B2 and B3 are positioned such that their end portions opposite to the heads are oriented obliquely downward toward the upper surface of the table 2.

The switching rod 41 is supported within a support hole 22*h* formed in the support portion 22 so as to be rotatable about its axis. The switching rod 41 extends parallel to the support shaft 23 and is spaced downwardly therefrom by a predetermined distance. As the support portion 22 rotates relative to the base portion 21 (and eventually the cutting unit 10 is laterally tilted), the switching rod 41 makes parallel shifting movement in unison with the support portion 22 along a movement path of a circular arc about the support shaft 23. A switching lever 42 and a stop ring 44 can prevent the axial movement of the switching lever 41.

As shown in FIG. 6, the rear end of the switching rod 41 protrudes rearwardly from the support hole 22*h*. The switching lever 42 is mounted to the protruded end of the switching rod 41. The switching lever 42 can be pivoted by an angle of about 60° to rotate the switching lever 41 by the same angle about its axis.

The front end of the switching rod 41 protrudes forwardly from the support hole 22*h* and extends into inside of the base portion 21. On the circumference of the protruded end of the switching rod 41, two 46° positioning surfaces 41*a* configured as flat surfaces are formed. The 46° positioning surfaces 41*a* are spaced from each other by an angle of 180° in the circumferential direction and extend parallel to each other. The remaining two surfaces (arc shaped surfaces) positioned between the 46° positioning surfaces 41*a* in the circumferential direction serve as 45° positioning surfaces 41*b*.

As the cutting unit 10 tilts leftward or rightward about the support shaft 23 to rotate the support portion 22 relative to the base portion 21, the switching rod 41 makes parallel shifting movement along an arc shaped path about the support shaft 23. The second stopper bolt B2 is positioned to correspond to one end of the arc shape movement path of the switching rod 41 and the third stopper bolt B3 is positioned to correspond to the other end of the movement path of the switching rod 41. Therefore, when the switching rod 41 moves along the arc shaped path, the front end of the switching rod 41 is brought to contact the second stopper bolt B2 or the third stopper bolt B3, so that the tool unit 10 can be set at the 45° tilt position and the 46° tilt position for each of the left and right tilting directions. Thus, rotating the switching rod 41 by an angle of about 60° by the operation of the switch lever 42 can switch between a 46° setting position, where the 46° positioning surfaces 41*a* can contact the second stopper bolt B2 and the third stopper bolt B3, and a 45° setting position, where the 45° positioning surfaces 41*b* can contact the second stopper bolt B2 and the third stopper bolt B3.

Figure 10:
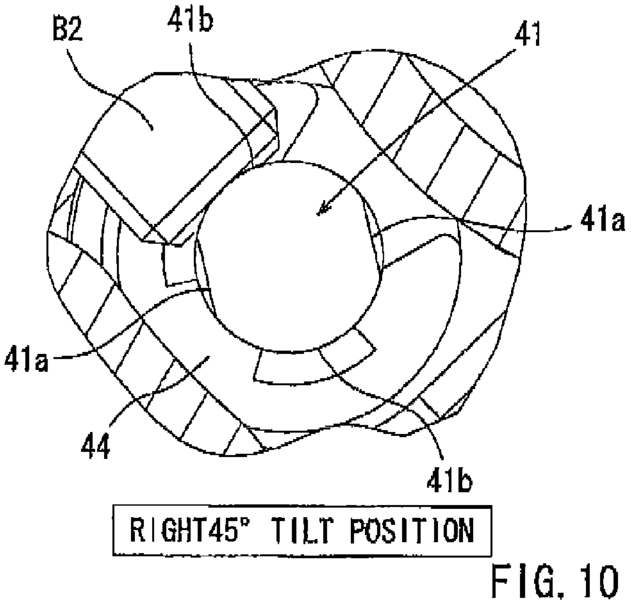
FIG. 10 is an enlarged view of a region (X) in FIG. 9.
Figure 13:
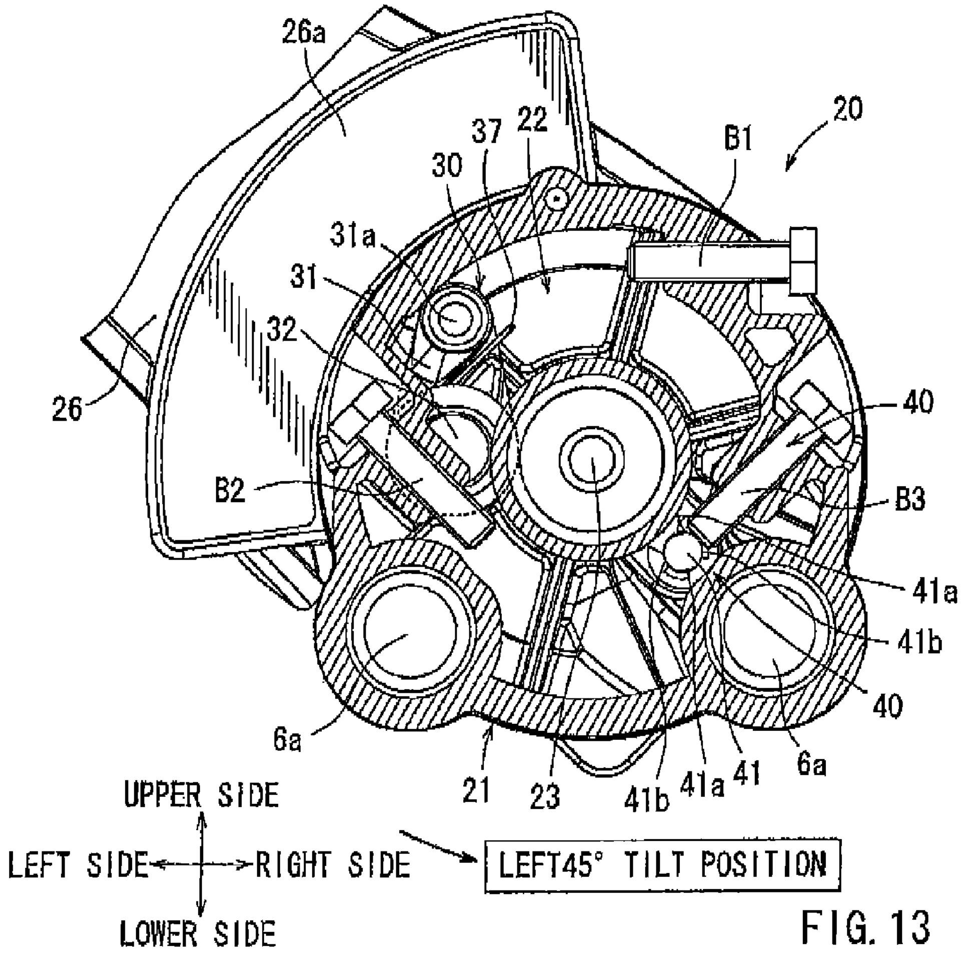
FIG. 13 is a sectional view similar to FIG. 8 but showing the operation of the positioning mechanism when the cutting unit is positioned at a left 45° tilt position.

Referring to FIGS. 9 and 10, when the cutting unit 10 is tilted rightward on the condition that the switching lever 42 is operated to the 45° setting position for positioning the 45° positioning surfaces 41*b* on the moving path of the switching rod 41, one of the 45° positioning surfaces 41*b* positioned on the left side as viewed in FIG. 9 is brought to contact the second stopper bolt B2 positioned on the left side as shown in FIG. 10. Therefore, in this case, the cutting unit 10 can be set at a right 45° tilt position. On the other hand, when the cutting unit 10 is tilted leftward on the condition that the switching lever 42 is operated to the 45° setting position as shown in FIG. 13, the other of the 45° positioning surfaces 41*b* positioned on the right side as viewed in FIG. 13 is brought to contact the third stopper bolt B3 positioned on the right side. Therefore, in this case, the cutting unit 10 can be set at a left 45° tilt position.

Figure 12:
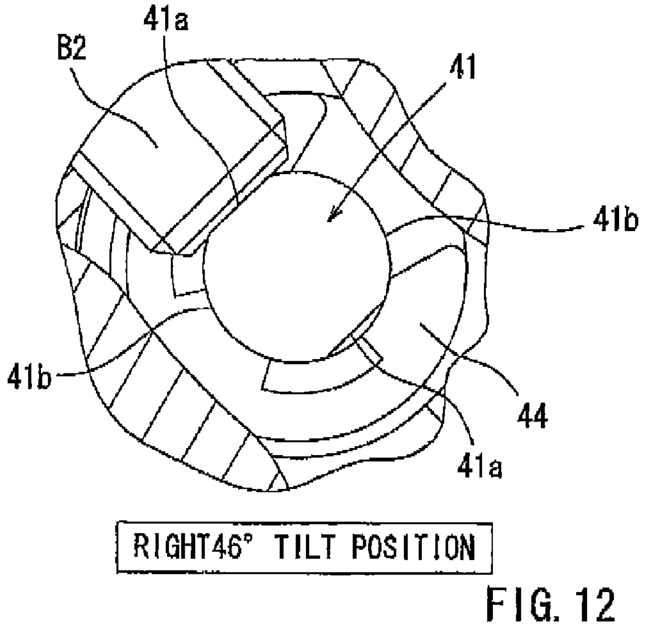
FIG. 12 is an enlarged view of a region (XII) in FIG. 11.

Referring to FIGS. 11 and 12, when the cutting unit 10 is tilted rightward on the condition that the switching lever 42 has been pivoted by an angle of about 60° from the 45° setting position for positioning the 46° positioning surfaces 41*a* on the moving path of the switching rod 41, one of the 46° positioning surfaces 41*a* positioned on the left side as viewed in FIG. 11 is brought to contact the second stopper bolt B2 positioned on the left side as shown in FIG. 12. Therefore, in this case, the cutting unit 10 can be set at a right 46° tilt position. On the other hand, when the cutting unit 10 is tilted leftward on the condition that the switching lever 42 is operated to the 46° setting position, the other of the 46° positioning surfaces 41*a* positioned on the right side is brought to contact the third stopper bolt B3 positioned on the right side. Therefore, in this case, the cutting unit 10 can be set at a left 46° tilt position. It should be understood that rotating the switching rod 41 by an angle of about 60° is enough to switch between the 45° setting position and the 46° setting position, because the 45° positioning surfaces 41*b* are configured as arc shaped surfaces.

In this way, pivoting the switching lever 42 by an angle of about 60° to switch between the 45° setting position and the 46° setting position can switch between the left or right 45° tilt position and the left or right 46° tilt position of the cutting unit 10.

Also the protruding distances of the second and third stopper bolts B2 and B3 into the base portion 21 can be adjusted by rotating the second and third stopper bolts B2 and B3, respectively, from the outer side of the base portion 21. Therefore, it is possible to finely adjust the left and right 45° tilt positions and the left and right 46° tilt positions by adjusting the screwing amounts of the stopper bolts B2 and B3.

A torsion spring 43 is provided for automatically returning the switching rod 41 to the 45° setting position. Referring to FIGS. 3 and 6, a lever restricting recess 22*e* is formed in the lower portion of the rear surface of the support portion 22. As shown in FIG. 3, the lever restricting recess 22*e* has a substantially inverted V-shape as viewed from the rear side and defines a right side wall 22*f* and a left side wall 22*g* inclined relative to each other by an angle of about 60°. The support hole 22*h* is positioned at the upper portion of the lever restricting recess 22*e* and the rear end of the switching rod 41 protrudes rearwardly from the support hole 22*h*. As shown in FIG. 6, the switching lever 42 is positioned within the lever restricting recess 22*e*, so that the switching lever 42 is permitted to pivot within an angular range of about 60°. One end 43*b* of the torsion spring 43 is engaged with the switching lever 42, and an opposite end 43*b* is pressed against the left side wall 22*b* (positioned on the right side as viewed in FIG. 3). Therefore, the switching lever 42 is biased toward the right side wall 22*f* (positioned on the left side as viewed in FIG. 3). When the switching lever 42 contacts the right side wall 22*f*, the switching lever 42 (or the switching rod 41) is positioned at the 45° setting position (see FIGS. 8 to 10 and 13). Therefore, in this example, the 45° setting position is an initial position of the switching lever 42 (or the switching rod 41).

When the user H pivots the switching lever 42 in the counterclockwise direction against the biasing force of the torsion spring 43 until the switching lever 42 contacts the left side wall 22*g*, the switching lever 42 (or the switching rod 41) is positioned at the 46° setting position (see FIGS. 11 and 12). As shown in FIG. 3, at the bottom of the lever restricting recess 22*b*, a character of "46" and an outline arrow are marked to indicate the pivoting direction of the switching lever 42 for switching to the 46° setting position.

In order to position the cutting unit 10 at the 46° tilt position, the user H holds the switching lever 42 at the 46° setting position and then tilts the cutting unit 10 leftward or rightward, so that one of the 46° positioning surfaces 41*a* contacts the second stopper bolt B2 or the third stopper bolt B3. After the cutting unit 10 has been set to the 46° tilt position, the fixing lever 28 is tightened, so that the cutting unit 10 is fixed at the 46° tilt position. At this stage, the switching rod 41 is held in the 46° setting position through contact of one of the 46° positioning surfaces 41*a* with the second stopper bolt B2 or the third stopper bolt B3, Therefore, the switching lever 42 is locked in a state of contacting the left side wall 22*g* of the lever restricting recess 22*e*.

If the user H releases the fixing lever 28 to return the cutting unit 10 to the vertical position after the cutting operation of the workpiece with the cutting unit 10 positioned at the right or left 46° tilt position, the switching rod 41 moves away from the second stopper bolt B2 or the third stopper bolt B3. Because the switching rod 41 is biased toward the 45° setting position, the switching rod 41 automatically rotates by an angle of about 60° to return to the 45° setting position as soon as the switching rod 41 moves away from the second stopper bolt B2 or the third stopper bolt B3. At the same time, the switching lever 42 also returns to the initial position where the switch lever 42 contacts the right side wall 22*f* of the lever restricting recess 22*e*.

As described above, when the cutting unit 10 returns to the vertical position after the cutting operation with the cutting unit 10 positioned at the 46° tilt position (hereinafter also called "large angle tilt position"), the switching lever 42 or the switching rod 41 automatically returns to the 45° setting position for the 45° tilt position (hereinafter also called "small angle tilt position"). Thus, it is possible to reliably prevent the cutting operation form being performed again with the large angle tilt position after the cutting operation with the large angle tilt position. In other words, in the case that a cutting operation with a small angle tilt position is intended after a cutting operation with a large angle tilt position, it is possible to prevent an unintended cutting operation with tire large angle tilt position. As a result, disposal of the cut workpiece produced as a result of the untended cutting operation would not be necessary.

In the case that a cutting operation with the 46° tilt position (large angle tilt position) is intended after a cutting operation with the 45° tilt position (small angle tilt position), if an unintended cutting operation again with the 45° tilt position has been performed by mistake after the cutting operation with the 45° tilt position, an additional cutting operation to the workpiece can be performed by operating the switching lever 42 of the positioning mechanism 40 for properly setting the cutting unit 10 to the 46° tilt position. Therefore, also in this case, disposal of the cut workpiece produced as a result of the untended cutting operation would not be necessary.

As described previously, the positioning mechanism 20 is designed to accurately set the pivotal axis J of the cutting unit 10. It may be necessary that the pivotal axis J is accurately positioned with the plane of the upper surface of the table 2 and that the pivotal axis J passes accurately through the rotational axis of the table 2 in plan view. For example, if the pivotal axis J does not pass through the rotational axis of the table 2, an inclined cutting operation with the cutting unit 10 tilted rightward or leftward cannot provide an accurate cut angle because a cut surface of a workpiece may be inclined rightward or leftward and may also incline forward or rearward (i.e., a direction of cutting) from an intended cut angle.

In addition, for example, due to deflection of mainly the slide bars 6*a* and 7*a* of the upper and lower slide mechanisms 6 and 7 caused by the weight of the cutting unit 10 (called an "overhang load") or due to the clearances at the slide portions of the upper and lower slide mechanisms 6 and 7, the pivotal axis J tends to offset in a lifting direction (a sinking direction of the cutting unit 10) to cause the rear side of the pivotal axis J to shift upward relative to the front side. When the movement of the pivotal axis J in the lifting direction occurs, the position of the cutting unit 10 in the vertical direction may change depending on the sliding amount of the cutting unit 10. Thus, the vertical position of the cutting unit 10 becomes unstable to cause unstable cutting depth into the workpiece. In particular, in the case of a grooving operation, it is difficult to form a groove with a uniform cutting depth.

Further, in the case that the inclined cutting operation is performed, if the pivotal axis is not within the plane of the upper surface of the table 2 and is inclined due to the overhang load or any other factors, a cut surface of a workpiece may be inclined in the forward or rearward direction as the cutting unit 10 moves to slide.

The inclination of the pivotal axis J depends on the inclination of a central axis J21 of the radially inner side surface 21*b* of the base portion 21 and/or the inclination of a central axis 122 of the radially inner side surface 22*b* of the support portion 22. Typically, the radially inner side surface 21*b* is formed to be perpendicular to the radially outer flat surface 21*a* because these surfaces can be formed simultaneously by a single cutting operation. As for the radially inner side surface 22*b* and the radially outer flat surface 22*a*, typically, they are formed to be also perpendicular to each other by a simultaneous cutting operation although they may be formed separately by different cutting operations. Each of the radially outer flat surface 21*a* and the radially outer flat surface 22*a* is configured to be flat throughout the entire surface. Therefore, when the fixing lever 28 is tightened after inserting the inner side surface 22*b* into the inner side surface 21*b*, the radially outer flat surface 21*a* and the radially outer flat surface 22*a* contact each other throughout their entire surfaces. This type of joint is called "spigot joint" or "faucet joint." Therefore, the inclination of the cutting unit 10 in the vertical direction depends on the inclination in the forward and rearward direction of the radially outer flat surface 21*a* and/or the radially outer flat surface 22*a*. Normally, the radially outer flat surface 21*a* and the radially outer flat surface 22*a* are set to be perpendicular to the upper surface of the table 2 and the side surface of the cutting tool 12. A clearance of about 2 to 3 mm may be provided between the radially inner flat surface 21*c* positioned on the leading end side of the inner side surface 21*b* and the radially inner flat surface 22*c* positioned on the base end side of the inner side surface 22*b*.

In this example, in order to compensate for the potential inclination of the pivotal axis J, a projection 50 is formed on the radially inner flat surface 21*c* as shown in FIG. 4. The projection 50 is positioned at a portion of the flat surface 21*c* positioned upward relative to the central axis 121 of the flat surface 21*c*. The projection 50 extends in the circumferential direction of the flat surface 21*c* within a predetermined angular range about the central axis J21 and protrudes toward the inner flat surface 22*c*.

In this example, the base portion 21 is a die-cast product and the projection 50 is formed integrally with the flat surface 21*c*. No cutting operation for finishing the flat surface 21*c* is made. In other words, the flat surface 21*c* is left to be a casting surface. Only the end surface of the projection 50 is finished by the cut operation, so that a dimensional accuracy is given to the end surface of the projection 50. On the other hand, the flat surface 22*c* is finished by being cut, A flat plate 29 having a configuration like a flat washer and made of wear resistant material is disposed at the flat surface 22*c*. The flat surface 22*c* is formed by the cutting operation that is made simultaneously with the cutting operation of the inner side surface 22*b*, so that the flat surface 22*c* is accurately perpendicular to the inner side surface 22*b*. Because the flat plate 29 is disposed at the flat surface 22*c*, the surface of the flat plate 29 is accurately parallel to the flat surface 22*c*. With this arrangement, at the upper portion of the base portion 21, the projection 50 contacts the flat surface 22*c* with an intervention of the flat plate 29, while at the lower portion of the base portion 21, the flat portion 21*a* contacts the flat portion 22*a*.

Because the projection 50 is in contact with the plate 29, the support portion 22 is coupled to the base portion 21 in a state that the support portion 22 is inclined in such a direction that the upper portion of the support portion 22 is positioned rearwardly. Therefore, it is possible to absorb displacement of the pivotal axis J of the cutting unit 10 in the sinking direction relative to the table surface. As a result, an accurate cut surface can be achieved when an inclined cutting operation is performed. In addition a uniform cutting depth can be achieved when a grooving operation is performed.

It may be possible to perform cutting operations of the inner side surface 22*b* and the flat surface 22*c* in the state that these surfaces are inclined rearwardly with an aid of a jig, so that the cutting unit 10 is inclined. However, in this case, in order to make fine adjustment of the inclination angle, a troublesome operation of rotating the jig little by little is required.

According the above example, a distance L between the flat surface 21*a* and the end surface of the projection 50 can be determined by changing the cutting amount of the flat surface 21*a* and/or the end surface of the projection 50. Therefore, no jig is necessary, and hence, the adjustment work can be easily performed.

As described above, according to the positioning mechanism 20 of this example, if the cutting unit 10 is tilted leftward or rightward after setting the switching rod 41 to the 46° setting position, one of the 46° positioning surfaces 41*a* contacts the second stopper bolt B2 or the third stopper bolt B3, so that the cutting unit 10 can be positioned at the left or right 46° tilt position.

After the cutting operation with the cutting unit 10 positioned at the 46° tilt position, if the user H loosens the fixing lever 2 and pivots the cutting unit 10 in such a direction that the tilt angle becomes small, the one of the 46° positioning surfaces 41*a* contacted with the second stopper bolt B2 or the third stopper bolt B3 moves away therefrom.

As soon as the one of 46° positioning surfaces 41*a* moves away from the second stopper bolt B2 or the third stopper bolt B3, the switching rod 41 rotates by an angle of about 60° by the biasing force of the torsion spring 43 to return to the 45° setting position. When the switching rod 41 is at the 45° setting position, the 45° positioning surfaces 41*b* are positioned on the are shaped moving path of the switching rod 41. Therefore, if the user H again pivots the cutting unit 10 leftward or rightward, the cutting unit 10 can be positioned at the left or right 45° tilt position.

For the reason described above, according to the positioning mechanism 20 of this example, if the user H forgets to operate the switching rod 41 after the cutting operation with the 46° tilt angle and then performs a cutting operation, the workpiece W is always cut with a cut angle of 45°. Therefore, it is possible to avoid potential waste of the workpiece W that was cut with the 46° tilt angle and cannot be repaired for correcting the cut angle in the case that the workpiece W was intended to be cut with the 45° tilt angle.

The above example can be modified in various ways. For example, although the cutting device 1 is provided with the lower and upper slide mechanisms 6 and 7, the cutting device 1 may have a single slide mechanism or may have no slide mechanism.

In addition, although an angle of 46° and an angle of 45° were exemplified as a large tilt angle and a small tilt angle, respectively, angular values for the large tilt angle and the small tilt angle are not limited to these angles and may be suitably determined. Further, although two different tilt angles (46° and 45°) can be set for each of the right and left tilting directions in the above example, the present teachings can be applied to a positioning mechanism that can set three or more different tilt angles for each of the right and left directions.

Furthermore, although the switching rod 41 can be switched between the 45° setting position and the 46° setting position as it is rotated by an angle of about 60° about its axis, the switching rod 41 may be configured to be shiftable in the axial direction in order to change between the 45° setting position and the 46° setting position. In such a case, the torsion spring 43 may be replaced with a compression spring that biases the switching rod 41 in the axial direction.

What is claimed is:

1. A cutting device comprising:

a table capable of placing a workpiece thereon;

a cutting unit supported on the table and positioned above the table;

a base portion on the side of the table;

a support portion on the side of the cutting unit and rotatable relative to the base portion, so that the cutting unit can tilt in the left direction and the right direction;

a positioning mechanism configured to position the cutting unit in a vertical position and at a plurality of tilt angles including a first tilt angle and a second tilt angle in at least one of a left direction and a right direction, the first tilt angle being larger than the second tilt angle;

the positioning mechanism including:

at least one stopper bolt mounted to one of the base portion and the support portion; and a switching rod mounted to the other of the base portion and the support portion and capable of contacting the stopper bolt; the switching rod including a first positioning surface and a second positioning surface for positioning of the cutting unit at the first tilt angle and respectively; the switching rod being rotatable between the first positioning surface and the second positioning surface; and a biasing device configured to bias the switching rod toward an initial position where the second positioning surface can contact the stopper bolt such that as the cutting unit is moved from the first tilt angle to the second tilt angle, the positioning mechanism automatically returns from the setting state for the first tilt angle to the setting state for the second tilt angle.

2. The cutting device as in claim 1, wherein the first positioning surface includes a pair of flat surfaces disposed on opposite sides of the switching rod in a diametrical direction.

3. The cutting device as in claim 1, wherein:

each of the base portion and the support portion has an axis, a radially outer flat surface, a side surface perpendicular to the radially outer flat surface, and a radially inner surface perpendicular to the side surface and parallel to the radially outer flat surface, the radially outer flat surface, the side surface and the radially inner surface of each of the base portion and the support portion are formed in series with each other and each extends in a circumferential direction about the axis;

the radially outer flat surfaces, the side surfaces and the radially inner surfaces of the base portion and the support portion are respectively opposed to each other;

a projection is formed on an upper portion of one of the radially inner surfaces and protruding in an axial direction therefrom; and a flat plate is interleaved between the projection and the other of the radially inner surfaces.

4. The cutting device as in claim 3, wherein the flat plate is made of wear resistant material.

5. The cutting device as in claim 1, further comprising:

a support mechanism configured to support the cutting unit on the table such that the cutting unit tilts in at least one of left and right directions from a vertical direction, wherein the support mechanism includes a first member mounted to the table and a second member movably coupled to the first member and supporting the cutting unit, and the position setting member is movably mounted to one of the first and second members.

6. The cutting device as in claim 5, wherein:

the positioning mechanism further includes a contact member mounted to the other of the first and second members of the support mechanism such that the contact member is configured to contact the position setting member if the cutting unit is positioned at either the first tilt position or the second tilt position; and the position of the contact member is adjustable relative to the other of the first and second members.

7. A cutting device comprising:

a table capable of placing a workpiece thereon;

a cutting unit;

a base portion on the side of the table;

a support mechanism supporting the cutting unit on the table, so that the cutting unit can tilt in at least one of left and right directions from a vertical direction; and a positioning mechanism configured to position the cutting unit in a vertical position and at a plurality of tilt angles including a first tilt angle and a second tilt angle in at least one of a left direction and a right direction, the first tilt angle being larger than the second tilt angle;

the positioning mechanism includes:

at least one stopper bolt mounted to one of the base portion and the support mechanism, a position setting member configured to move between a plurality of setting positions including a first setting position for setting a first tilt angle of the cutting unit and a second setting position for setting a second tilt angle of the cutting unit, the position setting member being rotatable between the first setting position and the second setting position, and a biasing device biases the position setting member toward the second setting position such that as the cutting unit is moved from the first tilt angle to the second tilt angle, the positioning mechanism automatically returns from the setting state for the first tilt angle to the setting state for the second tilt angle.

8. The cutting device as in claim 7, wherein:

the support mechanism includes a first member mounted to the table and a second member movably coupled to the first member and supporting the cutting unit, and the position setting member is movably mounted to one of the first and second members.

9. The cutting device as in claim 8, wherein:

the position setting member has a first positioning surface and a second positioning surface capable of interacting with the other of the first and second members if the position setting member is positioned at the first setting position and the second setting position, respectively.

10. The cutting device as in claim 9, wherein the position setting member is a rod having an axis, and the rod is supported by the one of the first and second members so as to be rotatable about the axis.

11. The cutting device as in claim 10, wherein the first positioning surface and the second positioning surface are formed on an outer surface of the rod and are arranged in a circumferential direction of the rod.

12. The cutting device as in claim 11, wherein the first positioning surface is a flat surface and the second positioning surface is a part of a cylindrical surface.

13. The cutting device as in claim 11, wherein the rod has a plurality of first positioning surfaces and a plurality of second positioning surfaces.

14. The cutting device as in claim 8, wherein:

the positioning mechanism further includes a contact member mounted to the other of the first and second members of the support mechanism, such that the contact member is configured to contact the position setting member if the cutting unit is positioned at either the first tilt position or the second tilt position; and the position of the contact member is adjustable relative to the other of the first and second members.

15. The cutting device as defined in claim 8, wherein:

the first and second members are rotatably coupled to each other;

each of the first and second members has an axis, a radially outer flat surface, a side surface perpendicular to the radially outer flat surface, and a radially inner surface perpendicular to the side surface and parallel to the radially outer flat surface, the radially outer flat surface, the side surface and the radially inner surface of each of the first and second members are formed in series with each other and each extends in a circumferential direction about the axis, the radially outer flat surfaces, the side surfaces and the radially inner surfaces of the first and second members are respectively opposed to each other;

a projection is formed on an upper portion of one of the radially inner surfaces and protruding in an axial direction therefrom; and a flat plate is interleaved between the projection and the other of the radially inner surfaces.

16. The cutting device as in claim 15, wherein the flat plate is made of wear resistant material.

17. A cutting device comprising:

a table configured to place a workplace thereon;

a cutting unit;

a support mechanism configured to support the cutting unit on the table such that the cutting unit tilts in at least one of left and right directions from a vertical direction of the table, the support mechanism including:

(1) a first member mounted to the table, and (2) a second member rotatably coupled to the first member and supporting the cutting unit, wherein each of the first and second members has an axis, a radially outer flat surface, a side surface perpendicular to the radially outer flat surface, and a radially inner surface perpendicular to the side surface and parallel to the radially outer flat surface, the radially outer flat surface, the side surface and the radially inner surface of each of the first and second members are formed in series with each other and each extends in a circumferential direction about the axis, the radially outer flat surfaces, the side surfaces and the radially inner surfaces of the first and second members are respectively opposed to each other, a projection is formed on an upper portion of one of the radially inner surfaces and protruding in an axial direction therefrom, and a flat plate is interleaved between the projection and the other of the radially inner surfaces;

a positioning mechanism configured to position the cutting unit in a vertical position and at a plurality of tilt angles including a first tilt angle and a second tilt angle in at least one of a left direction and a right direction, the first tilt angle being larger than the second tilt angle, the positioning mechanism includes:

at least one stopper bolt mounted to one of the base portion and the support mechanism, a position setting member configured to move between a plurality of setting positions including a first setting position for setting a first tilt angle of the cutting unit and a second setting position for setting a second tilt angle of the cutting unit, the position setting member being rotatable between the first setting position and the second setting position;

a contact member mounted to the other of the first and second members of the support mechanism such that the contact member is configured to contact the position setting member if the cutting unit is positioned at either the first tilt position or the second tilt position, the position of the contact member being adjustable relative to the other of the first and second members; and a biasing device biases the position setting member toward the second setting position such that as the cutting unit is moved from the first tilt angle to the second tilt angle, the positioning mechanism automatically returns from the setting state for the first tilt angle to the setting state for the second tilt angle.

18. The cutting device as in claim 17, wherein the flat plate is made of wear resistant material.

19. The cutting device as in claim 17, wherein the cutting unit is vertically pivotally supported on the second member in a cantilever manner.

20. The cutting device as in claim 17, wherein the support mechanism further includes a slide mechanism, so that the cutting unit can slide in a direction parallel to an upper surface of the table.

* * * * *